INVENTOR.
ROBERT E. GORDON
BY
Joseph E Ryan
ATTORNEY

July 12, 1966  R. E. GORDON  3,260,848
LINE FOLLOWER CONTROL APPARATUS
Filed April 1, 1963  4 Sheets-Sheet 4

INVENTOR.
ROBERT E. GORDON
BY
Joseph E. Ryan
ATTORNEY

United States Patent Office 3,260,848
Patented July 12, 1966

3,260,848
LINE FOLLOWER CONTROL APPARATUS
Robert E. Gordon, Brooklyn Center, Minn., assignor to Honeywell Inc., a corporation of Delaware
Filed Apr. 1, 1963, Ser. No. 269,579
12 Claims. (Cl. 250—202)

This invention relates to a line follower tracing control apparatus particularly adapted for following line type contours of templets to produce output signals therefrom or indications related to the contour of the templet which signals or indications may be used for controlling slave machines in performing working functions on a work piece such as cutting, drawing, etc. to the identical contour of the line type templet and for stopping the tracing operation at predetermined points for separate work functions, such as drilling.

Tracing machines of the master tracer or line follower type are well recognized. They have the disadvantage at present of being limited in their usage through a limitation in the accuracy of tracing and the operation of the slave machines associated therewith. This limitation is dictated by the quality of the templet, such as the line type drawing, and more particularly by rate of response of the associated control apparatus making up the tracer system. Accuracy in machining of contours and of following lines for performing other machining operations on a work piece, such as drilling at predetermined center locations, is essential in a successful tracing apparatus. The present invention is directed specifically to an improved tracing apparatus in which the speed control section of the tracing function is accurately controlled and, in addition, auxiliary apparatus operating in conjunction with the speed control apparatus permits stopping of the tracing function and hence stopping of the operation of the work machine or slave machine for auxiliary work operations at accurately located points. This permits the accurate locating of drill points on a drawing with a tracing pattern connecting the drill points permitting operation of the machine to the exact locations for the drilling operation.

Therefore it is an object of this invention to provide a new and improved line follower tracing control apparatus which is relatively simple and inexpensive in construction and operation and permits operation of slave machines in direct relation to the contour of the templet. Another object of this invention is to provide an improved photoelectric control apparatus suitable for master tracing or line following machines with control of speed of operation and stopping of the control apparatus. These and other objects of this invention will become apparent from a reading of the attached description together with the drawings wherein:

Figure 1:
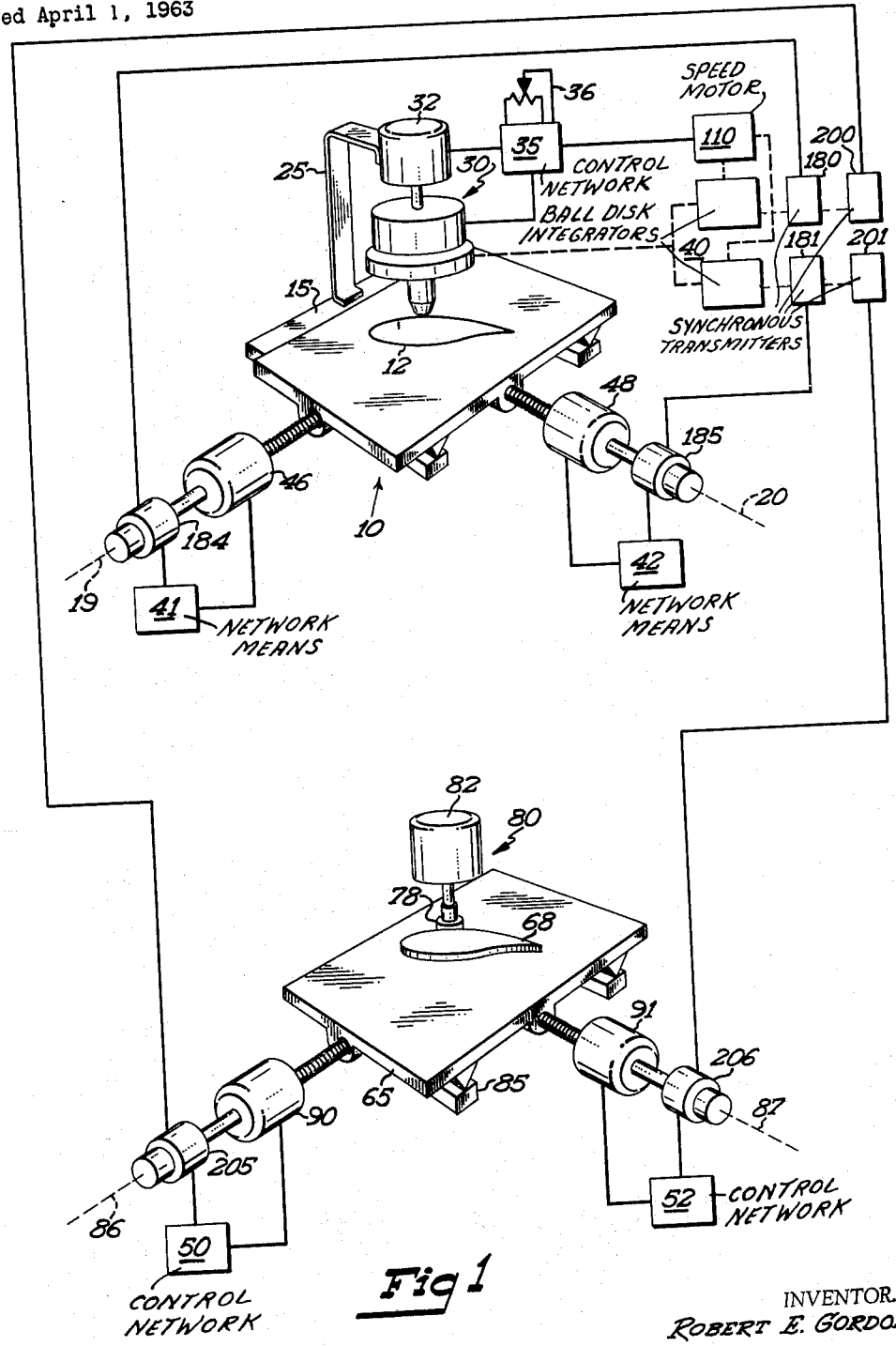
FIGURE 1 is a general perspective view of the improved line following or tracing control apparatus applied to a table and a slave machine shown in diagrammatic form.

The diagrammatic disclosure of FIGURE 1 shows the improved line following control apparatus applied to a slave machine. This control apparatus includes primarily a table 10 upon which a templet 12 is mounted. The templet 12 may be a line type drawing or an actual templet mounted on the table so that the edge of the same defines a line surface or line type contour which is adapted to be followed in the operation of the control apparatus. The table 10 is mounted on the support 15 which includes a mounting for the table about a pair of displacement axes indicated generally at 19 and 20 through suitable means, such as ways. Support 15 also includes a bracket section 25 extending over the center of the table and mounting the sensing head indicated generally at 30. The sensing head is adapted to be driven or rotated on the support through suitable drive means or motor 32, and the signal output from the sensing head 30 is connected into a control network, indicated in block at 35, which control network controls the energization of the motor 32. Also operated or controlled by the motor 32, that is driven in part by the same, is an integrating apparatus or resolving apparatus 40. Control network 35 also controls a speed adjusting motor 110, which with motor 32 acts on the integrating apparatus 40 to control the operation of the same on synchronous transmitting and receiving apparatus for the templet table and the machine tool as will be hereafter described. Network 35 includes an external speed setting means or potentiometer 36 for this purpose. The resolver 40 drives synchronous transmitting apparatus 180, 181 in additional network means 41, 42, which network means includes receivers 184, 185 to provide the control output for drive motors 46, 48 of the respective axes 19 and 20 of the table. The resolving apparatus which provides the input signals for the table 10 also has associated therewith synchronous transmitting apparatus 200, 201 which connects to receivers 205, 206 on the machine tool, respectively in control networks 50, 52 of the slave machine indicated by table 65. Thus, FIGURE 1 also shows a work table 65 depicting a work bed of a machine tool, which bed has mounted thereon a work piece 68 which is adapted to be machined. Associated with the machine bed 65 and positioned in working relationship with the work piece 68 is a cutting tool mechanism 80 including a tool 78 and a drive motor 82. The details of this portion of the apparatus form no part of the present invention and are shown herein schematically for explanation purposes. The work table or work bed is adapted to be positioned on a base 85 about a pair of axes 86, 87 through operation of motors 90, 91 in a conventional manner. Thus the operation of the motors 90, 91 are slaved with the motors 46, 48 of the templet table through the operation of resolver 40. The motors 90, 91 may also be slaved to the operation of the table through transmitters mounted on the displacement axes of the table if desired.

While I have shown the templet table and the machine tool bed as moving about a pair of axes relative to the sensing head and working tool, it will be understood that either or both the table and work bed may remain stationary while the sensing head and tool are displaced in the displacement axes.

Figure 2:
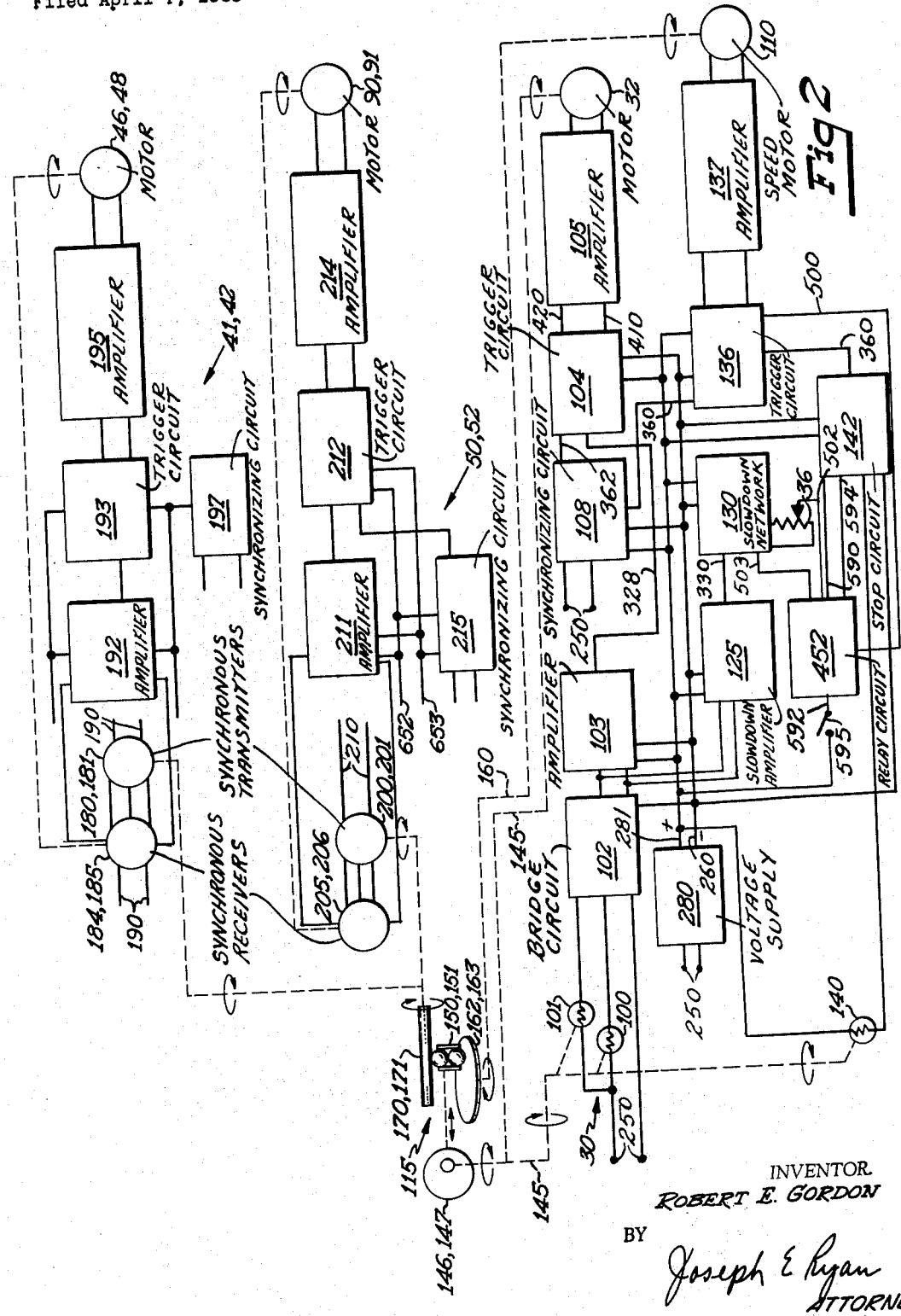
FIGURE 2 is a schematic electric and mechanical view showing all the electrical and mechanical parts of the improved line following apparatus.

In FIGURE 2 the mechanical and electrical circuitry are shown in block diagram for simplicity to present a schematic indication of the over-all control apparatus of the improved line follower control. Thus the sensing head indicated at 30 is comprised basically of a pair of photocells 100, 101 which are included as a part of a head bridge circuit indicated in block at 102 which bridge circuit supplies and controls an amplifier 103 associated with the sensing head. The output of the head bridge circuit controls two drive motors, one the positioning motor 32 for the sensing head and the other the speed motor 110 which operates on the integrating apparatus 115 in FIGURE 2. Thus, as is shown in the schematic diagram, the output of the head amplifier 103 is connected to trigger circuit 104 and a control or power amplifier 105 to control the energization of the motor 32 with a synchronizing circuit 108 also connected to the trigger circuit 104 for synchronization purposes. In a parallel circuit a slow down amplifier 125 receives its input signal from the head bridge 102 and is connected to a slow down network 130 which includes an external setting device or potentiometer 36. Potentiometer 36 sets the speed level of operation of motor 110 which level is modified by the output from the sensing head 30. The output of the slow down circuit or network 10 is connected through a trigger circuit 136 to a power amplifier 137 controlling the energization of the speed motor 110. This circuit also includes a relay circuit 452 which selects a speed setting under given operating conditions, as will be later defined. The sensing head 30 also includes additional photocell means, indicated by a photocell 140, which is connected through a stop circuit 142 to act on a trigger circuit 136. Photocell 140 is also connected through stop circuit 142, the relay circuit 452, and the slow down circuit 130 to act on trigger circuit 136, and to in turn control power amplifier 137 which controls the energization of the speed motor 110.

As shown in FIGURE 2, the drive motor 32 positions the sensing head 30 through the mechanical connection indicated at 145. Also attached to the sensing head are cam means 146, 147 (only one shown) which provides an adjustment to the ball section 150, 151 of a pair of ball disc integrators 115. The two integrators 115 with their driving cams and speed motor form the resolver 40 (FIGURE 1) which provides the signals to the axes of the table and machine tool. The eccentric cams are designed to be displaced 90 degrees apart to effect a sine or cosine movement of the ball section of the ball disc integrator 115 for the purpose of resolving output signals for the two axes of the follower control. The input to the integrator from the speed motor 110 is through the mechanical connection indicated at 160 which connects to the drive section 162, 163 of the integrators. The outputs from the integrators are taken at the output drive sections 170, 171. Although a single integrator is shown, it will be understood that a separate integrator is provided for each axis to be controlled for the table and slave drive circuits. A common drive motor and a common speed motor drive both integrators, and the speed motor 110 is connected through suitable gearing to each of the input sections 162 or 163 of the respective integrators.

The mechanical outputs from the integrators respectively drive the transmitters for the two axes of the table drive and also drive directly the transmitters for the slave machine. Thus, as is shown in FIGURE 2, the respective outputs 170, 171 of the integrators or resolver 40 are connected to synchrotransmitters 180, 181 for the table drive apparatus. The double numbering is used to indicate that both axes are identical and that two such transmitters are provided and connected respectively to a pair of receivers 184, 185 which are connected in a conventional synchro loop circuit energized through an excitation supply indicated generally at 190. The output of the synchro system is connected to an amplifier 192, a trigger circuit 193 and a drive amplifier 195 for the motors 46 and 48. Included in this energization circuit is a synchronizing circuit 197 which synchronizes the trigger circuit 193 in a conventional manner. Since both the axes have identical circuits, only the double identification for the transmitters, receivers and motors will be included, it being understood that two such circuits are employed.

Similarly the drive circuit for the slave machine includes synchrotransmitters 200, 201, for the respective axes which have associated therewith receivers 205, 206 connected in the conventional synchro energization circuit and being energized through a suitable excitation supply indicated at 210. The output of the synchro system is fed through an amplifier 211 and a trigger circuit 212 to a power drive amplifier 214 associated with and controlling the energization of the motors 90, 91. It will be understood in this case that identical amplifiers, trigger circuits and power drive amplifiers control respectively the motors 90, 91 and that a separate synchro system is used for each axis of the slave drive. Also included in this energization circuit is the synchronizing circuit 215.

Thus, the control circuitry shown in FIGURE 2 in block form indicates that the main control circuits for the sensing head are utilized to control two motors, one of which rotates the sensing head 30 on its support 75 and at the same time the control circuit also controls the tracing rate of the table drive motors 46, 48 and the slave drive motors 90, 91 by means of a separate speed motor 110 which operates on the speed section of the ball disc integrator 115. The head motor 32 in positioning the sensing head also adjusts the sine and cosine generators in the form of eccentric cams 146, 147 on the sensing head which vary the output of the integrators. The integrators 115 are connected to synchrotransmitters for each axis of the table drive motors and slave drive motors of the machine tool.

The actual drive circuits for the table and the slave machine, only one of which is shown, are largely conventional. They employ transmitters connected to associated receivers with the receivers being connected to the respective motors in a conventional mechanical feedback connection and with the output of the synchro circuits connected through an amplifier to a control circuit for a power amplifier controlling the excitation and operation of the respective motors. The actual details of the individual components shown in block in FIGURE 2 will be explained in FIGURES 3 and 4, respectively together with the additional function or special function of the stop circuit which operates on the slow down circuit for the head and speed motors to effect slow down and stop of the table drive and slave drive motors. It will be recognized that this apparatus is an improvement over the type of structure shown in Dulebohn et al. Patent 2,989,639, dated June 20, 1961, on a Master Tracing Machine.

Figure 3:
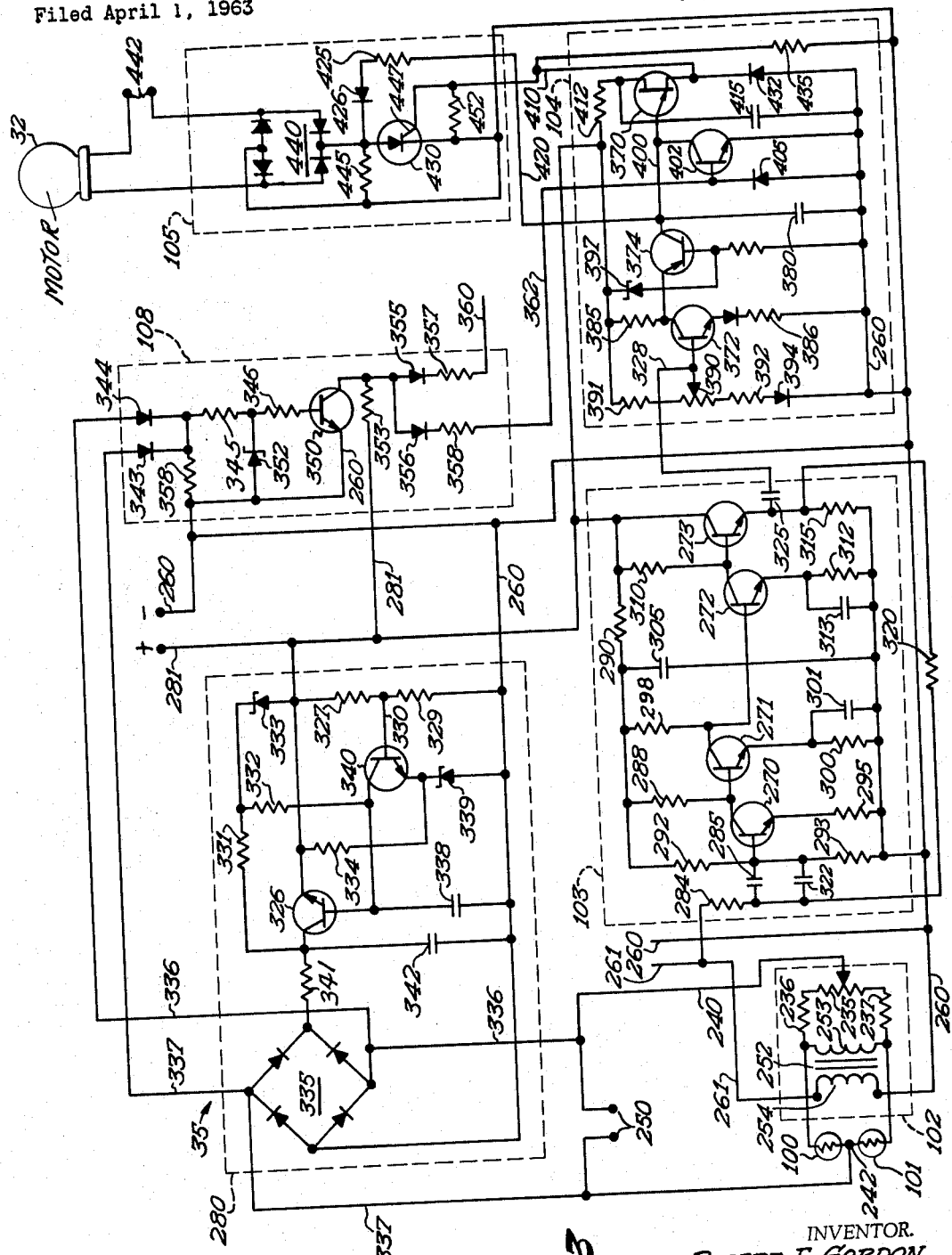
FIGURE 3 is a schematic wiring diagram of a portion of the control apparatus, including a sensing head, and associated control for the drive circuit for the sensing head.

The schematic wiring diagram of FIGURE 3 includes the circuit details for the blocks shown basically in FIGURE 2. Thus, as will be seen from FIGURE 2, the sensing head 30 of the line follower apparatus includes a pair of photocells 100, 101 which are designed to be positioned over and in line with the line templet on the table which is to be followed. In FIGURE 3, it will be seen that these photocells or photoelectric sensors are connected in a series circuit and are positioned in a bridge circuit 102 in opposite legs thereof. The bridge 102 includes a potentiometer 235 in the opposite side thereof together with fixed resistors 236, 137. The wiper of the potentiometer 235 which connects with a conductor 240 defines one input or energizing terminal or conductor for the bridge circuit. A second input conductor or terminal is evidenced at 242 connected to the midpoint of the photocells 100, 101. Included in this circuit between the conductors 242, 240 is a 40 volt alternating current source of power indicated at 250. The output of the bridge circuit is taken from a transformer 252 having a primary winding 253 connected across the bridge circuit with the secondary winding 254 being connected between a ground conductor 260 and an input conductor 261 to the head amplifier 103.

Figure 4:
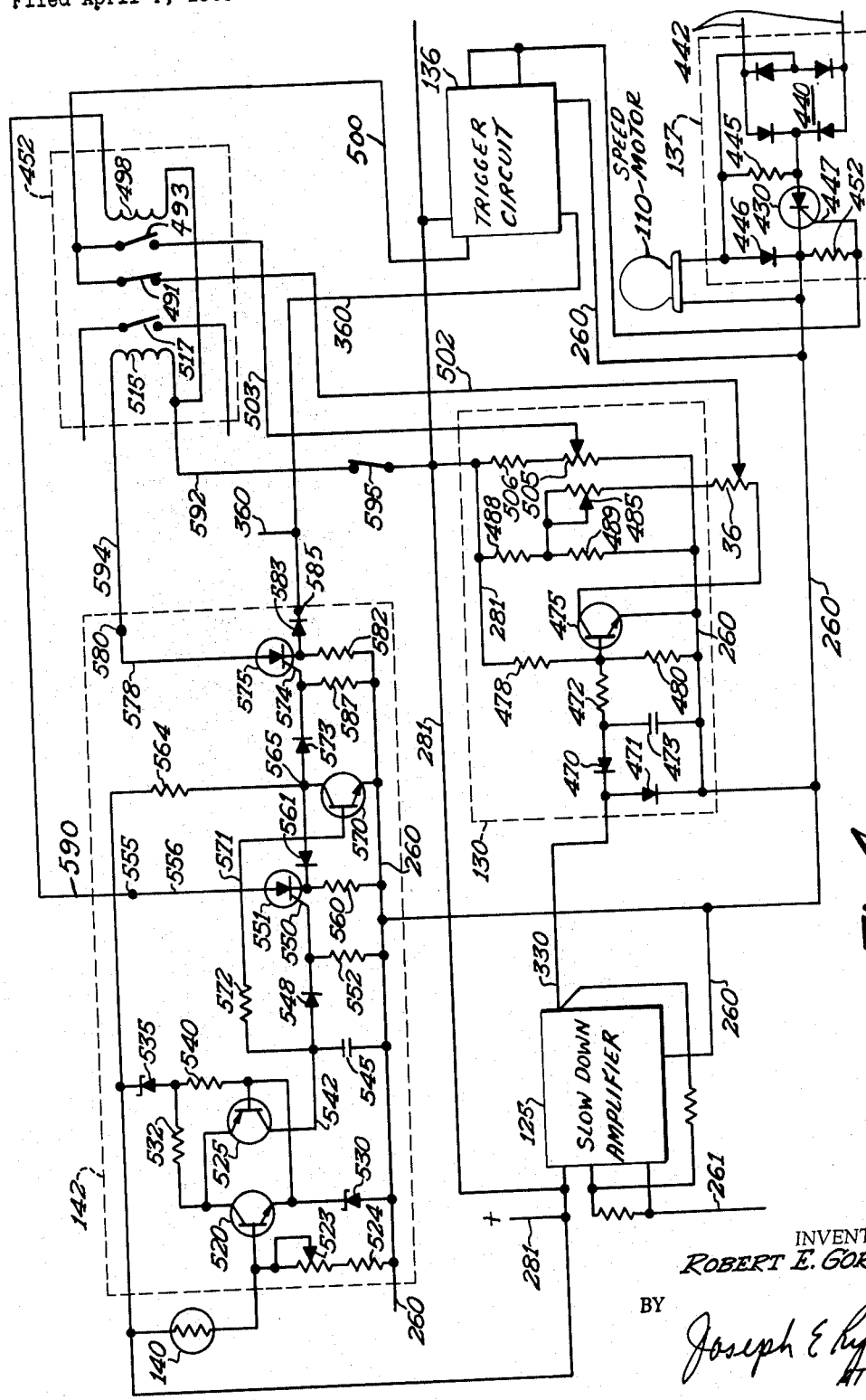
FIGURE 4 is a schematic wiring diagram of the speed drive portion of the apparatus operated from the sensing head.

The output of the bridge circuit 102 for the sensing head 30 is supplied to two amplifier units, one being the head amplifier indicated in block at 103, and the second, the slow down amplifier indicated in block at 125 in FIGURE 2 and FIGURE 4. Since these units are identical only one will be described in detail. The amplifier unit 103 consists of four direct coupled NPN type transistors numbered 270, 271, 272, and 273. They are connected in a grounded emitter configuration and powered from a 30 volt B+ supply indicated in general at 280 and connected to the amplifier through a conductor 281. The input to the first transistor 270 is through a bias resistor 284 and coupling condenser 285 to the base of the transistor 270 whose collector is connected through a load resistor 288 to the B+ conductor 281 including a voltage dropping resistor 290. Bias on the base of the transistor 270 is obtained through a voltage dividing network formed by resistors 292 and 293 connected in series between the B+ supply and ground conductor 260 with the midpoint of the resistors being connected to the base of transistor 270. The ground conductor 260 is common to all transistor units and the emitter of the transistor 270 is connected through a resistor 295 to the conductor 260. The collector is direct coupled to the base of the second transistor 271 whose collector in turn is connected through a load resistor 298 to the B+ conductor 281 and whose emitter is connected through a resistor 300 having a condenser 301 in parallel therewith to the ground conductor 260. A decoupling condenser 305 is connected between the resistor 290 and ground conductor 260 for decoupling the first two stages of the amplifier. Transistor 271 is in turn direct coupled to the base of the transistor 272 whose collector is connected through a load resistor 310 to the unfiltered B+ conductor 281 and with its emitter connected to the ground conductor 260 through an emitter resistor 312 having a bypass condenser 313 in parallel therewith. The final stage of the amplifier or transistor 273 is direct coupled to the collector of transistor 272 through its base with its collector connected directly to the B+ conductor 281 and with its emitter connected through voltage bias resistor 315 to ground conductor 260. The emitter is also connected through a feedback resistor indicated at 320 for stability purposes and a coupling condenser 322 to the dividing network or resistors 292, 293 at the input or base of the transistor 270. The output from this amplifier 103 is taken from the emitter of the transistor 273 through a coupling condenser indicated at 325. In the case of the head amplifier 103 this output circuit is connected through the conductor 328 to the input of the trigger circuit indicated generally at 104.

The B+ supply for the amplifier and remaining units of the control circuit is supplied from the supply module 280 which includes a full wave rectifier 335 whose input diagonals are connected across conductors 336, 337 leading to the alternating current source 250 which supplies the head bridge circuit 102. The B+ supply 280 is a regulated power supply in which the transistor 326 connected in series with the output of the full wave rectifier 335 is the regulating or current controlling unit. The full wave rectifier 335 converts the alternating current supply impressed on its input diagonals through conductors 336 and 337 into a direct current output. The transistor 326 connects one diagonal of the rectifier to the B+ conductor 281 through a resistor 341 while the other output diagonal or terminal of the rectifier is connected to the ground conductor 260. The sensing portion of the regulator is provided by the transistor 340 whose base is connected by a conductor 330 to the midpoint of a voltage dividing network formed by resistors 327 and 329, these resistors of the dividing network being connected between the supply conductor 281 and ground conductor 260. The collector of transistor 340 is connected by means of resistors 331 and 332, in series, to the input side of the transistor 326 or its collector at resistor 341. The emitter electrode of this sensing transistor 340 is tied to the ground conductor 260 through a Zener diode or regulating diode 339 which establishes a predetermined voltage at this emitter, with this circuit being completed through a bias resistor 334 to conductor 281. The regulating transistor 326 has its base connected to the bias circuit with the collector of transistor 340 such that it receives a bias signal through the resistors 331 and 332 from the input side or collector side of the transistor 326 which signal is controlled by the operation of the sensing transistor 340. This latter base circuit is tied to the ground conductor 260 through a filter condenser 338 and an additional filter condenser 342 is connected between the input to the regulating section or collector of transistor 326 and the ground conductor 260. In addition, a Zener or regulating diode 333 is connected between the B+ output conductor 281 and the common point between the resistors 331 and 332 to hold the voltage at this point above the output supply voltage at conductor 281. This diode is a start and preregulating device which is conventional. This B+ supply circuit provides a regulated direct current to the various amplifying, synchronizing and trigger circuits of the control apparatus, as will be later defined. A variation in load between the conductors 281 and 260 will effect a variation in the voltage across the dividing network of resistors 327 and 329 causing the transistor 340 to change its conduction thereby effecting a change in bias on the base of the regulating transistor 326 to increase or decrease the current flow from the full wave rectifier through the transistor 326 to the B+ supply conductor to maintain the voltage output therefrom.

The output of the head amplifier 103 is connected to the head trigger circuit 104, which provides a trigger pulse to fire or control a silicon controlled rectifier included in the head drive amplifier 105. Associated with the head trigger circuit is the synchronizing circuit 108 which receives as an input signal alternating current from the supply conductors 336, 337. These conductors are connected to a pair of diodes 343, 344, which in turn are connected in common and through voltage bias resistors 345, 346 to the input or base electrode of a transistor 350. A Zener type diode or voltage regulating diode 352 is connected between the ground conductor 260 and the midpoint of the bias resistors 345, 346 to regulate the bias level on the synchronizing transistor. In addition, a resistor 358 is connected between the ground conductor 260 and the common connection between the diodes 343, 344. Transistor 350 has its collector connected through a bias resistor 353 to the B+ supply conductor 281 with the output circuit including a pair of diodes 355, 356 connected through load resistors 357, 358 to output terminals which are adapted to be connected respectively to the trigger circuits for both the speed and head drives amplifying units, as will be later defined. This particular circuit is used to cyclically turn off the unijunction transistor of the trigger circuits. Thus, as will be seen in FIGURE 4, the output circuit through diodes 355 and load resistor 357 of FIGURE 3 includes a conductor 360 which connects to conductor 360 of FIGURE 4 and then to the speed trigger circuit 136 controlling the speed drive 137 as will be later defined. The second output circuit through the diode 356 and load resistor 358 includes a conductor 362 which leads to the head trigger circuit 104.

The trigger circuit 104 is basically a unijunction transistor 370 with suitable control for providing a pulsed or peaked output therefrom capable of firing a silicon controlled rectifier. The unijunction transistor circuit or trigger circuit 104 is energized from the B+ conductor 281 and includes a pair of transistors 372, 374 controlling the charging of a condenser 380 which in turn controls the bias on the emitter junction of the unijunction transistor 370 to control the firing of the same. The transistor 372 has its collector connected through a constant voltage dropping resistor 385 with its emitter connected through a bias resistor 386 to ground conductor 260. The base of this transistor is connected to a voltage dividing network including potentiometer 390 and resistors 391, 392 connected between the B+ conductor 281 and ground 260 through a diode 394. The input connection to the trigger circuit is from the output of the head amplifier 103 through the conductor 328 which is connected to the base of the transistor 372. The second transistor 374 is a current control for the charging of the condenser 380 and its emitter is directly coupled to the collector of the transistor 372 with its collector connected to the condenser 380 which in turn is connected to the ground. A Zener diode or a voltage regulating diode 397 is connected between the base of the transistor 374 and the B+ conductor to provide a constant bias on the base of the transistor 374. The voltage change on the collector of the transistor 374 will provide or control the firing of unijunction 370. The characteristics of these transistors are so adjusted that as the transistor 372 turns off an increased current flow will be experienced at the transistor 374, increasing the charging rate of the condenser 380.

Condenser 380 is connected to the emitter electrode of the unijunction transistor 370 through a conductor 400 and this condenser is discharged every half cycle or synchronized through a transistor 402 whose collector is connected to the emitter electrode of the unijunction transistor 370 and whose emitter is connected to the ground conductor 260. The base of this transistor receives the input pulse or synchronizing pulse from the synchronizing circuit 108 through the conductor 362 each half cycle and in parallel therewith is a diode 405 which is connected to ground and the base of transistor 402 to keep the voltage level on the base at a predetermined point between pulses. The transistor 402 when it conducts at each half cycle from the synchronizing pulse effects a short on the condenser 380 providing a discharge path from the same synchronize the same for every half cycle of alternating supply voltage and current. The charge on the condenser 380 as it builds up is controlled by the transistors 372, 374 and will control the firing time of the unijunction transistor 370 to provide a pulse from the base thereof through the output terminals 410. The second base electrode of the unijunction transistor has a load resistor 412 connected therewith and to the B+ supply with an additional decoupling circuit or condenser 415 connected between this base and the ground conductor 260 which prevents the trigger pulses from being reflected back into the B+ supply. An additional clamping circuit is utilized in the head trigger circuit in the form of a conductor 420 which connects the condenser 380 to a resistor 425, diode 426 combination in the anode of a silicon controlled rectifier 430 being controlled thereby in the drive amplifier 105 when the silicon controlled rectifier of the drive amplifier 105 fires. This silicon controlled rectifier 430, upon energization or operation of the same, provides the clamping effect on the condenser 380 so that false firing of the unijunction transistor will not occur through the remainder of the cycle. An additional clamp in the form of a rectifier 432 connected between ground and the base one electrode of the unijunction transistor 370 as well as a resistor 435 connected between ground and the output terminals of the unijunction transistor 370 is provided for controlling the magnitude of firing current to the apparatus to be controlled thereby.

The drive circuit 105 for the head motor 32, that is the head motor which rotates the sensing head 30 on the support 25 is a silicon controlled rectifier drive utilizing the rectifier 430 connected across the diagonals of the full wave rectifier 440 whose input diagonals lead to a source of power 442 and the armature winding of a direct current motor 32 the rotation of which is to be controlled by the trigger circuit 104. The output diagonals of the full wave rectifier 440, which include the silicon controlled rectifier in series therewith, have a resistor 445 connected in parallel across the same. Similarly this circuit includes or is connected to the ground conductor 260, and the firing circuit for the unijunction transistor 370 includes the resistor 435 connected to the control electrode 447 of the silicon controlled rectifier 430. An additional resistor 452 is connected between the cathode and a control electrode of rectifier 430 for loading purposes and to provide a path for the control pulse from a unijunction transistor of the trigger circuit. The drive module 105 is similar to the speed drive circuit 137 and provides half-wave rectification of the alternating current for reversible control of a motor. In the case of the speed motor drive circuits, the circuit is slightly modified to provide full wave unidirectional operation of the motor, as will be later explained.

Thus it will be seen that the head drive for the sensing head receives its input from the photocells 100, 101 which signals are amplified by the amplifier 103 and its alternating current output controls the operation of the trigger circuit 104 which in turn controls the operation of the silicon controlled rectifier drive 105 in the control of the rate and direction of rotation of the motor associated therewith. The power supply 280 and the synchronizing circuit 108 are used for both channels of control, that is the head drive and the speed circuit of the sensing head. The amplifier and trigger circuits are largely conventional and are identical between the two channels. Hence, they will be explained in detail for the head drive circuit only for simplicity. It will be noted that the output of the head bridge circuit 102 is connected to the slow down amplifier 125 (FIGURE 4), which is identical with the head amplifier 103, and the output therefrom is connected through a conductor 330 (FIGURE 4) to the input of the speed and slow down control circuit 130. The direct current output of this device 130, which may be modified by a relay circuit indicated at 452, will operate the trigger circuit 136. Circuit 136 is identical with the trigger circuit 104 for the head drive and it controls the operation of the silicon controlled rectifier drive 137 to be hereafter defined.

The speed and slow down circuit 130 receives a signal input from a slow down amplifier 125 which may modify the normal operation or output of the speed and slow down circuit 130 as set by control or potentiometer 36 in the control of the trigger circuit 136. This input to the speed and slow down circuit 130 is through diodes 470, 471 and a filter network including a resistor 472 and a capacitor 473 connected between the input conductor and ground conductor 260 at the base of the transistor 475. This transistor has its base biased by a voltage dividing network including resistors 478, 480 connected in series from the B+ conductor 281 to the ground conductor 260 with the midpoint of the resistors being connected to the base of transistor 475. The collector of this transistor is connected to the external speed setting potentiometer 36 which in turn is connected in series with an adjustable resistor 485. Resistor 485 is connected to the common point between fixed resistors 488, 489 which are connected in series between the B+ supply conductor 281 and ground conductor 260. The emitter of transistor 475 is connected to ground conductor 260. The externally adjustable potentiometer 36 provides the primary means for setting the normal following speed of the apparatus which is modified by the signal from the sensing head. The wiper of this potentiometer 36 is connected to a normally closed contact 491 of the relay 452 having also a normally open contact 493 and operated by a coil 498. The movable element of this relay circuit or the common connection between the contacts is in turn connected through a conductor 500 to the trigger circuit 136. The normally open contact of the relay structure, shown in the block 452, is connected through a conductor 503 to the wiper of the potentiometer 505 in a voltage dividing network comprised of resistor 506 connected in series with the potentiometer 505 between the B+ conductor 281 and ground conductor 260. This is the creep or slow speed resistor setting, which, when the relay coil 498 is energized and the normally open contact is closed, will provide a circuit from the potentiometer 505 to the input of the speed trigger circuit 136 through conductor 500. In addition to the above, the relay circuit 452 includes a second relay coil 515 and a normally open contact 517 associated therewith, for purposes which will be later noted. Thus the output of the head bridge circuit 102 applied through the slow down amplifier 125 will provide an output signal to the speed and slow down circuit 130, which under normal conditions provides a voltage output from the external potentiometer 36 connected through the normally closed contact 491 of the relay circuit 452 to provide a direct current voltage input to the speed trigger circuit 136 for control of the same. The magnitude of the input signal from the slow down amplifier 125 will be so adjusted that whenever the normal following or tracing signal is obtained, the transistor 475 will be turned on and the normal speed potentiometer 36 will be connected through the voltage limiting resistors to provide a predetermined voltage output to the conductor 500. As the magnitude of the input signal increases with an increase in error, the resistance to current flow through the transistor 475 will vary, increasing the voltage output level by increasing the impedance of the transistor to effect a change in the magnitude of this output signal to the speed trigger circuit and causing slow down in the operation of the associated silicon controlled rectifier drive circuit 137. The magnitude of this input signal or error signal may increase to a point where the speed motor will stop operation, as in cornering.

In addition to the above, auxiliary control signals are supplied from the stop circuit 142, indicated in FIGURE 4, which affect the trigger circuit 136. This stop circuit 142 is basically controlled by a stop photocell 140 mounted in the sensing head 30 apart from the main sensing photocells 100, 101 of the sensing head and adapted to respond to the presence of a stop line 700 apart from the main contour or positioned to the side of the same, which line provides an indication of stop information for the line following apparatus. Thus the photocell 140 represents an impedance at the input of circuit 142 which will change or increase upon sensing the presence of the line and return to its normal value after the line has been passed over. The stop photocell 140 is connected to the B+ conductor 281 at one extremity and the opposite extremity of the photocell 140 is connected to the base of a transistor 520, which transistor is connected in a high gain amplifying circuit arrangement with a second transistor 525. The base of the transistor 520 is connected through bias resistors 523, 524 to the ground conductor 260 which forms with the photocell 140 the adjustable bias on the base of the transistor. The emitter of the transistor is connected through a Zener or constant voltage diode 530 to the ground conductor 260. This diode 530 together with diode 535 and resistor 540 establishes the voltage levels or references for the stability of the operating point of the amplifier. This emitter is also connected to the base of the second transistor 525 and the collector of transistor 520 is connected to the emitter of transistor 525 and through a load resistor 532 and the diode 535 to the B+ conductor 281. The collector of transistor 525 is connected through a conductor 542 and diode 548 to the control electrode 550 of a silicon controlled rectifier 551. A condenser 545 connected between the collector and ground conductor 260 forms with the diode 548 a delay line in the operation of rectifier 551. A bias resistor 552 is connected between one control electrode 550 and the ground conductor 260 for this control circuit. The anode of rectifier 551 is connected through a conductor 556 to an output terminal 555 for purposes to be later noted. The cathode of the silicon controlled rectifier 551 is connected through a bias resistor 560 to the ground conductor 260 and through a diode 561 to a bias point for the control circuit indicated generally at 565. This bias point also has connected thereto the B+ supply through a resistor 564. Connected between the bias point and the ground conductor 260 is a third transistor 570 whose collector is connected to the bias point and whose emitter is connected to the ground conductor 260. Its base is connected through a conductor 571 and a bias resistor 572 to the conductor 542 and the collector of transistor 525 of the amplifying circuit.

Bias point 565 also has a diode 573 connected to the control electrode 574 of a second silicon controlled rectifier 575 whose anode is connected to an output terminal 580 through a conductor 578 and whose cathode is connected through a bias resistor 582 to ground conductor 260. A second diode 583 is connected between the cathode and the output terminal 585 and a bias resistor 587 is connected between the control electrode 574 and the ground conductor 260. Thus the stop circuit 142 will operate from the change in impedance of photocell 140 to fire sequentially the silicon controlled rectifiers 551 and 575 and effect a change in the operation of the relay circuit 452 and to effect a change on the manner in which the speed and slow down circuit 130 controls trigger circuit 136. With normal operation of the line follower apparatus, the photocell 140 does not see a stop line and hence its resistance is low. This will produce a zero voltage on condenser 545 since the amplifier output is zero. Bias point 565 of this circuit is held at a predetermined bias level below the firing level of rectifier 575 by conduction or current flow in a circuit which includes the B+ supply conductor, bias resistor 564, diode 561 and resistor 560. As resistance of cell 140 increases upon seeing a stop line to the side of the main templet, the input to the amplifier or transistor 520 changes causing transistor 525 to fire and providing a charge across condenser 545. This signal, applied to the base of transistor 570, will cause it to conduct and saturate. The signal also fires the rectifier 551 through the delay network after transistor 570 saturates. This conduction of transistor 570 will hold the bias point 565 below the firing level of rectifier 575. When the cell has passed over the stop line, its impedance will reduce or change back to its normal level. This will reduce the output from transistor 525 and the charge on condenser 545 to zero level. The transistor 570 will come out of saturation and the voltage on the bias point 565 will increase to a level sufficient to fire the rectifier 575. This bias level on point 565 raises because its normal conduction path through resistor 560 is no longer available with the firing of rectifier 551 and before it has been reset.

Thus the operation of this stop circuit is designed to control the operation of relay circuit 452 or the energization of relay coils 498 and 515 in a sequence to effect a change in the output bias from the speed and slow down circuit 130 on the trigger circuit 136. As will be seen in FIGURE 4, the output terminal 555 is connected through a conductor 590 to the coil 498 leading to the B+ supply through a conductor 592 and a reset switch 595. The output terminal 580 similarly is connected to a conductor 594 leading to the relay coil 515 and from the common point between coils 498 and 515 to the conductor 592 leading to the switch 595 and the power supply. The terminal 585 is connected to the synchronizing pulse line 360 from the synchronizing circuit 108 (FIGURE 3). This circuit will supply a voltage bias to the trigger circuit 136 to disable the trigger circuit and affect the operation of this circuit such that the drive circuit 137 will be de-energized or stopped. Thus in operation the single photocell or stop cell 140 acts on the stop circuit 142 because of its change in impedance as it detects the stop line positioned to one side of the main line contour which the sensing head is following. This increase in impedance operates the silicon controlled rectifier 551 to provide an output through the terminal 555. This output will energize the relay coil 498 and cause operation of the normally open and normally closed contacts 493, 491 of the relay circuit 452. The change in relay operation will effect a change in the speed bias output connection in the speed and slow down circuit 130 causing a creep speed signal to be fed to the input of the speed trigger circuit 136. Thus, upon the presence of a stop line as sensed by the stop cell 140, an immediate switching takes place to the creep speed.

However, when the stop line disappears and the stop cell changes impedance back again, to a low valve, the turning off of the stop amplifier will permit the silicon controlled rectifier 575 to fire due to the bias on the point 565. This will provide an output to the energization circuit of the relay coil 515 which in the present disclosure operates the contact 517 to control an external energization circuit such as an indicating light (not shown) or auxiliary controls indicating that the stop condition exists. The firing of the silicon controlled rectifier 575 produces a signal output on the terminal 585, through the conductor 360, to add a bias to the synchronizing conductor 360, and originating at FIGURE 3, and to the base of the control transistor for the unijunction transistor in the trigger circuit 136 (similar to control transistor 402 and unijunction transistor 37 of the circuit 104 of FIGURE 3). This will effect a turn off or saturation of this control transistor and thus prevent an output from the trigger circuit 136. The silicon controlled rectifier 430 in the speed drive circuit 137 thereby does not fire, to effect stopping of the speed drive motor 110. This will also effect stopping of the synchro systems for the table and slave drive, as will be later evident.

After firing of the silicon controlled rectifiers 551 and 575, it is necessary to manually or automatically operate reset switch 595 by opening the same to de-energize the silicon controlled rectifiers and stop operation of the same. Thus after the line following apparatus has stopped, switch 595 will be operated to initiate operation of its motors. The drive circuit 137 is similar to drive circuit 105 except for connection of the motor thereto which effects a change in the operation of the circuit. Thus in circuit 137 the full wave rectifier 440 is connected directly to the alternating current source 442 at its input diagonals or terminals. The silicon controlled rectifier 430 is connected across the output diagonal or terminal of rectifier 440 and has in series therewith the motor armature of motor 110. A diode 446 is connected in parallel with the load circuit or motor armature. The control electrode 447 is connected to the output conductor of the trigger circuit from the base of the unijunction transistor (similar to unijunction 370 of FIGURE 3) with the loading resistor 452 being connected to the control electrode and cathode of rectifier 430 which circuit is completed through the ground conductor 260 which is connected to the cathode of the rectifier. This drive circuit gives full wave unidirectional control of speed motor 110.

Thus, under normal operation, the slow down amplifier 125 will control the operation of the speed and slow down circuit 130. The output signal from slow down amplifier 125 will modify the speed signal, as controlled by the remote potentiometer 36, which is supplied to the speed trigger circuit 136 to control the operation or energization of the silicon controlled rectifier drive circuit 137. Variation in the size of this output signal will affect the operation of the transistor 475 associated therewith to vary the output from the potentiometer 36 and effect slow down as the error signal changes or is increased. In addition to this speed and slow down control, a second or creep signal is provided from circuit 130 through operation of the relay circuit 452. This secondary circuit, however, is controlled by the stop circuit 142 as energized from the stop photocell 140 sensing the special stop line indicia to the side of the line type templet. Upon the presence of this stop line being observed by the photocell 140, the stop circuit 142 will provide an output signal to the relay circuit 452 which will switch over between contacts 491 to 493 to connect into the output of the speed slow down circuit 130 the creep potentiometer 505 with a different output signal to the speed trigger circuit 136 effecting slow down in the operation of motor 110. This switching is momentary since the photocell as it detects the change in the line or the passing over of the line will effect a new energization or operation of the silicon controlled rectifier 575 in the stop circuit 142 switching a direct bias to the trigger circuit 136 and disabling the same, causing stopping of the drive circuit 137 as well as operating an auxiliary relay 515 and its contact 517 to perform a special function, such as indication or drilling at the machine tool if desired.

The table drive and slave drive circuits are operated from the output of the integrators 115 (FIGURE 2) through their output shafts 170, 171 which have coupled thereto the transmitters 200, 201, and 180, 181 associated with these circuits 41, 42, 50, and 52, as shown in block in FIGURE 1. These transmitters may be mounted on the sensing head or, if desired, the slave drive transmitters may be associated with the drive axes of the table. For the purpose of the present disclosure, as set forth in FIGURE 2, these transmitters will be considered as being simultaneously operated from the output of the integrators 115 or resolver 40 and the control circuits for each of the respective axes for both the table and the slave drive for the machine tool will be basically identical. In FIGURE 2, the synchro transmitters and receivers are shown in block and only one axis is shown for each of the table drive and slave drive channels since the others are duplicates and all of the components are standard devices with circuit components previously described.

In the table drive circuits, the transmitters 180, 181 are energized from an alternating current source 190 with details of any phase adjusting equipment being omitted for simplicity. The interconnections between the transmitters and receivers are conventional and the output of the synchro system is connected to the amplifier unit identified as 192. The amplifier 192, the trigger circuit 193, and the synchronizing circuit 197 are all identical with the components 103, 104, and 108 previously described and their details are not repeated. The table drive circuit 195 is similar to the drive circuit 105 using the D.C. motor with a silicon controlled rectifier across an output diagonal of a full wave rectifier to provide half-wave or pulsating wave D.C. to the motor armature. This output is controlled by the trigger circuit 193 which controls the firing of the silicon controlled rectifier. Since these details are straightforward and have been previously described, they will be omitted here to avoid repetition.

The X and Y slave drive circuits for the machine tool axes, that is, the circuits controlling the operation of the motors 90, 91 of the machine tool, simultaneously with the operation of the table by virtue of the same output from the integrators 115 are shown herein as identical from a control standpoint with that of the table drive. The transmitters 200, 201 for the respective axes are connected to the receivers 205, 206 in a conventional manner. A differential transmitter (not shown) may be included in this connection so that adjustment may be effected between these component parts if desired. Similarly, jog or manual input signal controls may be included at these points if desired. The output of the synchro loops controls the energization of the amplifiers to energize and operate the slave machine with movement of the sensing head and the integrators 115. The amplifier 211, trigger circuit 212 and the synchronizing circuit 215 are all identical with the units 103, 104, and 108 previously described. This trigger circuit 212 drives the slave drive amplifying circuit having silicon controlled rectifiers indicated generally at 214. This latter unit is also identical with that of 195 and 105, previously described, and its details are omitted here for simplicity. While a simple type of direct current motor and control is shown herein, it will be evident that other types of motors, including alternating current motors, may be utilized with conventional modifications to the drive amplifying equipment shown herein.

Thus, it will be seen that this improved line following apparatus will provide resolved output signals from an integrator 115 operated from the sensing head or in conjunction therewith in accordance with deviation of the sensing head from the line type contour which is being followed on the table. The amount of deviation from the templet will control the speed of operation of the speed motor 110 operating on the integrating device which will provide a mechanical signal output to the control transmitters of the table drive and slave drive units. Since two integrating units are provided and they have sine and cosine generating type cams associated therewith operating on the separate integrating apparatus, the transmitter will provide resolved signals to operate the motors on the respective axes of the table and machine tool located normally in quadrature with one another. In addition to the speed control from the sensing head, a stop control in the form of a separate photocell operating on a stop circuit will provide a switching of the speed signals within the speed control channel to provide for a change in speed whenever a stop line is sensed and a second change de-energizing the motors whenever the stop line is passed indicating the presence or the actual sensing of a stop line apart from the templet. Such an indication may be used for stopping the apparatus and for operating associated drilling machinery or any other type of metal working apparatus if desired. The improved assembly utilizes the components of the speed control channel in the control of the speed motor operating on the integrator to control speed of operation of the respective axes of the table drives and slave drives.

In considering this invention it should be remembered that the present disclosure is intended to be illustrative only and the scope of the invention is to be determined only by the appended claims.

I claim as my invention:

1. In a line follower control apparatus, a table adapted to have a drawing type templet mounted thereon, a sensing head mounted on a support apart from said table with the axis of said head being adapted to be aligned with the curvature of said templet, said sensing head including photoelectric sensing apparatus adapted to be positioned in line with the curvature of said templet, means mounting said support and said table for relative movement about a pair of displacement axes, positioning means for positioning said head relative to said templet to maintain said head in axial alignment with the curvature of said templet, responsive means responsive to the output of said photoelectric sensing apparatus for controlling the energization of said positioning means, speed control means having setting means included as a part of said responsive means for controlling the speed of operation of said positioning means in accordance with the relationship of said photoelectric sensing apparatus to the curvature of said templet, additional photoelectric means included in said sensing head and responsive to indications on said templet indicative of the need of stopping said positioning means, said last named means being connected to said speed control means and operative therewith to overcome the effect of said first named photoelectric sensing apparatus on said responsive means, and means associated with said positioning means adapted to provide a signal output for slaving auxiliary machines to said positioning means.

2. In a line follower control apparatus, a table adapted to have a templet mounted thereon, a sensing head mounted on a support apart from said table with the axis of said head being adapted to be aligned with the contour of said templet, said sensing head including photocell sensing apparatus adapted to be positioned in line with the contour of said templet, positioning means for positioning said table relative to said head about a pair of axes to maintain said head in axial alignment with the contour of said templet, first responsive means for rotating said head on said support responsive to the output of said photocell sensing apparatus for controlling the rotation of said head on said support to maintain alignment of the axis of said head with the contour of said templet, further responsive means responsive to movement of said head for controlling said positioning means, speed control means including setting means included as a part of said further responsive means for controlling the speed of operation of said positioning means in accordance with a relationship of said photocell sensing apparatus to the contour of said templet, additional photocell means included in said sensing head responsive to indications on said templet indicative of the need of stopping said positioning means, said last named means being connected to said speed control means and operative therewith to overcome the effect of said first named photocell sensing apparatus on said positioning means, and means associated with said positioning means adapted to provide a signal output for slaving auxiliary machines.

3. A line following machine control apparatus for following a line contour displayed by a templet comprising: a templet carrying table, a contour direction sensing head in sensing relationship with a portion of the line contour of the templet and producing indications of the sensed direction of the contour, means mounting said table and sensing head for relative movement with respect to each other and about a pair of displacement axes, drive means for producing said relative movement about the displacement axes to facilitate movement of said sensing head with respect to the line contour of the templet, control means operating said drive means to control said relative movement, means operating said control means in response to indications from said sensing head and producing changes in direction of said relative movement to cause said sensing head to follow the line contour of the templet, speed control means included in said control means and responsive to changes in the indication from said head for varying the velocities of relative movement in response to abrupt changes in the indications and abrupt changes in the direction of the line contour, and further means included in said sensing head and adapted to respond to predetermined indicia on the templet to effect stopping of said relative movement upon alignment of said sensing head with said predetermined indicia.

4. A line following machine control apparatus for following a line type contour displayed by a templet comprising: a templet carrying table, a rotary sensing head movable about an axis adapted to intersect the line type contour of the templet, means mounting the table and the head for relative movement about a pair of displacement axes, reversible drive means for producing said relative movement to facilitate following by said head of the line type contour and alignment of the axis of said head with the line type contour of the templet, contour direction sensing means including photocell means positioned in said head and producing indications of the sensed direction of contour, means responsive to said indications for rotating said head to maintain a predetermined relationship between the axis of said head and the line type contour, responsive means responsive to the orientation of the axis of said head for producing a plurality of control signals individually varying in relationship to the orientation of the axis of said head, means applying said control signals to said drive means and including speed control means to control the rate of travel of said table relative to said head to cause the axis of said head to follow the line type contour, additional means included in said responsive means to effect a change in speed of said drive means in accordance with abrupt changes in direction of the line type contour, and additional means in said head responsive to special indications on the templet which are indicative of the need for stopping of said drive means, said last named means being connected to effect stopping of said drive means.

5. In a line follower control, a table, a support, movable means mounting said table and said support and capable of producing relative movement thereof along a pair of displacement axes, a sensing head mounted on said support for rotary movement about a first axis substantially normal to said table, a line contour templet adapted to be mounted on said table and to be oriented along the first axis of said sensing head such that a second axis of said head is in alignment with the line contour of the templet, said sensing head including photocell detectors adapted to be positioned in predetermined relation with the line contour templet through relative movement of said table and said support means controlled by the signal output from said photocell detector to cause rotation of said sensing head about said first axis, signal resolving means controlled by rotary movement of said sensing head about said first axis to produce a pair of signals, drive means for each of said displacement axis connected to and energized respectively from said pair of signals to produce relative positioning of said table and said support, slow down means included in said drive means and responsive to deviations of said second axis of said sensing head from the line contour templet to control the operation of said signal resolving means, and an auxiliary photocell detector included in said sensing head and connected to said slow down means to effect stopping of said drive means.

6. In a line following control, a table adapted to hold a templet, a support, means mounting said table and said support for relative movement about a pair of displacement axes, a sensing head mounted on said support for rotary movement about a first axis directed toward said table and having a second axis adapted to be aligned with the contour of the templet, said sensing head including photocell detectors adapted to be positioned in predetermined relation with the contour of the templet through relative movement of said table and said support and through rotation of said sensing head about said first axis, means controlled by the signal output from said photocell detector to position said sensing head about said first axis relative to said templet, integrating means controlled by rotation of said sensing head about said first axis to produce a pair of signals, drive means connected to and energized from said pair of signals for producing relative movement of said table and said sensing head, slow down means responsive to deviations of the second axis of said sensing head from the contour of the templet to control said integrating means, and auxiliary photocell means included in said sensing head and connected to effect cessation of operation of said drive means, said additional photocell means being positioned apart from said photocell detectors and being adapted to sense a line apart from the contour of the templet to effect stopping of said drive.

7. In a line follower control, a table, a sensing head, means mounting said table and said sensing head for relative movement along a pair of axes, a templet adapted to be mounted on said table and oriented such that an axis of said head is in alignment with a line contour of said templet, said sensing head including photocell means adapted to be positioned at a predetermined relationship with respect to the line contour of the templet through relative movement of said table and said sensing head means controlled by the signal output of said photocell means to relatively position said table and said sensing head, slow down control means included in said drive means and responsive to deviations of said sensing head axis from the line contour of said templet for slowing the operation of said drive means upon the occurrence of such deviations, and auxiliary photocell means included in said sensing head and connected to said drive means to stop operation of said drive means upon reaching predetermined positions on said templet.

8. In a line follower control, a table, a sensing head mounted in relation to said table, means mounting said table for movement about a pair of axes, a templet adapted to be mounted on said table and oriented such that an axis of said head is in alignment with a line contour of said templet, said sensing head including photocells adapted be positioned at a predetermined relationship with respect to the line contour of the templet through movement of said table with the templet thereon, means controlled by the signal output of said photocells to provide a pair of quadrature signals, drive means connected to and energized by said quadrature signals for positioning said table about said pair of axes, slow down control means included in said drive means and responsive to deviations of said predetermined relationship with respect to the line contour of the templet, and auxiliary means included in said sensing head and responsive to separate indicia on said templet, said auxiliary means being included in said drive means and being effective to modify the operation of said slow down control to stop operation of said drive means upon said sensing head reaching said separate indicia.

9. A line following apparatus for following a line contour displayed by a templet comprising: a templet carrying table, a line contour direction sensing head including photocell means positioned in sensing relationship with a portion of the line contour of the templet and producing indications of the sensed direction of the line contour, means mounting the table and the sensing head for relative movement with respect to each other and about a pair of quadrature axes, drive means for producing said relative movement about the quadrature axes to facilitate relative movement of said head with respect to the line contour of the templet, control means operating said drive means to control said relative movement, means operating said control means in response to indications from said photocell means and producing changes in direction of the relative movement to cause said sensing head to follow the line contour of the templet, speed control means included in said control means and responsive to changes in the indication from said photocell means for varying the velocities of relative movement in responses to abrupt changes in the indications and abrupt changes in the direction of the line contour, and further photocell means included in said direction sensing head and adapted to respond to predetermined indicia on the templet to effect stopping of said relative movement upon alignment of said sensing head with the indicia.

10. A line following apparatus for following a line contour displayed by a templet comprising: a templet carrying table, a line contour direction sensing head including photocell means positioned in sensing relationship with a portion of the line contour of the templet and producing indications of the sensed direction of the line contour, means mounting the table and the sensing head for relative movement with respect to each other and about a pair of displacement axes, drive means for producing said relative movement about the displacement axes to facilitate relative movement of said head with respect to the line contour of the templet, control means operating said drive means to control said relative movement, means operating said control means in response to indications from said photocell means and producing changes in direction of the relative movement to cause said sensing head to follow the line contour of the templet, speed control means included in said control means and responsive to changes in the indication from said photocell means for varying the velocities of relative movement in response to changes in the indications and changes in the direction of the line contour, and further detecting means included in said direction sensing head and adapted to respond to predetermined indicia on the templet to effect stopping of said relative movement upon alignment of said sensing head with the indicia.

11. A line following apparatus for following a line contour displayed by a templet comprising: a templet carrying table, a line contour direction sensing head including photocell means positioned in sensing relationship with a portion of the line contour of the templet and producing indications of the sensed direction of the line contour, means mounting the table and the sensing head for relative movement with respect to each other and about a pair of displacement axes, drive means for producing said relative movement about the displacement axes to facilitate relative movement of said head with respect to the line contour of the templet, control means operating said drive means to control said relative movement, means operating said control means in response to indications from said photocell means and producing changes in direction of the relative movement to cause said sensing head to follow the line contour of the templet, speed control means included in said control means and responsive to changes in the indication from said photocell means for varying the velocities of relative movement in response to changes in the indications and changes in the direction of the line contour, and further detecting means included in said direction sensing head and adapted to respond to predetermined indicia on the templet to effect slow down and thereafter stopping of said relative movement upon alignment of said sensing head with the indicia.

12. In a line follower control, a table, a sensing head, means mounting said table and said sensing head for relative movement along a pair of displacement axes, a templet adapted to be mounted on said table and oriented with respect to said sensing head such that an axis of said head is in alignment with a line contour of said templet, said sensing head including photocell detectors adapted to be positioned at a predetermined relationship with respect to the line contour of the templet through relative movement of said table and said head, means controlled by the signal output of said photocell detectors to provide a pair of signals, drive means connected to and energized from said signals for producing said relative movement of said table and said sensing head, slow down control means included in said drive means and responsive to deviations of said sensing head from the line contour of said templet to slow down the operation of said drive means, and auxiliary means included in said sensing head and responsive to separate indicia on said templet, said auxiliary means being included in said drive means and being effective to modify the operation of said slow down control to stop operation of the drive means upon said sensing head reaching said separate indicia.

References Cited by the Examiner
UNITED STATES PATENTS

| | | | |
|---|---|---|---|
| 2,851,643 | 9/1958 | Limberger | 250—202 X |
| 2,933,668 | 4/1960 | Brouwer | 318—162 |
| 2,989,639 | 6/1961 | Dulebohn et al. | 250—202 |
| 3,128,382 | 4/1964 | Rau et al. | 318 |

RALPH G. NILSON, *Primary Examiner.*

W. STOLWEIN, *Assistant Examiner.*